United States Patent
Strother et al.

(10) Patent No.: US 8,689,440 B2
(45) Date of Patent: *Apr. 8, 2014

(54) METHOD OF FORMING A HOLLOW COMPONENT WITH AN INTERNAL STRUCTURE

(75) Inventors: Oliver Michael Strother, Leeds (GB); Dean Gwynfryn Jones, Bristol (GB)

(73) Assignee: Rolls-Royce PLC (GB)

( * ) Notice: Subject to any disclaimer, the term of this patent is extended or adjusted under 35 U.S.C. 154(b) by 402 days.

This patent is subject to a terminal disclaimer.

(21) Appl. No.: 13/008,323

(22) Filed: Jan. 18, 2011

(65) Prior Publication Data

US 2011/0182744 A1    Jul. 28, 2011

(30) Foreign Application Priority Data

Jan. 22, 2010   (GB) .................................. 1001000.7

(51) Int. Cl.
*B23P 15/00*   (2006.01)

(52) U.S. Cl.
USPC ..................... 29/889.2; 29/889.7; 29/889.722

(58) Field of Classification Search
USPC ................. 29/889.2, 889.7, 889.72, 889.721, 29/889.722, 17.1, 17.2, 527.1, 527.2, 29/897.32; 219/76.1, 76.12–76.15; 228/164–172, 225
See application file for complete search history.

(56) References Cited

U.S. PATENT DOCUMENTS

| | | | |
|---|---|---|---|
| 2,916,808 A | 12/1959 | Wilkes, Jr. | |
| 3,927,817 A | 12/1975 | Hamilton et al. | |
| 3,936,920 A | 2/1976 | Conn, Jr. | |
| 4,043,498 A | 8/1977 | Conn, Jr. | |
| 4,292,375 A | 9/1981 | Ko | |
| 4,530,197 A | 7/1985 | Rainville | |
| 5,243,758 A | 9/1993 | LeMonds et al. | |
| 5,469,618 A * | 11/1995 | LeMonds et al. | 29/889.72 |
| 6,418,619 B1 * | 7/2002 | Launders | 29/889.7 |
| 7,640,661 B2 | 1/2010 | Despreaux et al. | |

(Continued)

FOREIGN PATENT DOCUMENTS

| | | |
|---|---|---|
| EP | 0527564 A1 | 2/1993 |
| EP | 1013355 A2 | 6/2000 |

(Continued)

OTHER PUBLICATIONS

European Search Report from corresponding EP Patent Application No. 11150539 dated Dec. 3, 2013.

*Primary Examiner* — David Bryant
*Assistant Examiner* — Christopher Besler
(74) *Attorney, Agent, or Firm* — McCormick, Paulding & Huber LLP

(57) ABSTRACT

A method of forming a hollow component with an internal structure from first and second panels includes the step of forming at least one protrusion on a surface of at least one of the first and second panels by a material deposition process. The first and second panels are assembled into a preform the panels being oriented such that each panel defines an interior and an exterior facing surface, with the at least one protrusion extending from an exterior facing surface of a panel. The preform is expanded against a die, such that the at least one protrusion is transferred from the exterior surface of a panel to the interior surface of a panel so as to define an internal structure. Forming the at least one protrusion may include encapsulating an elongate member on the surface of a panel by a material deposition process.

12 Claims, 2 Drawing Sheets

(56) References Cited

U.S. PATENT DOCUMENTS

| | | | |
|---|---|---|---|
| 7,827,883 B1 * | 11/2010 | Cherng et al. | 76/107.8 |
| 2007/0243070 A1 | 10/2007 | Matheny | |
| 2009/0016894 A1 | 1/2009 | Strother | |
| 2009/0057488 A1 | 3/2009 | Goldfinch et al. | |
| 2009/0057489 A1 * | 3/2009 | Goldfinch et al. | 244/123.14 |
| 2009/0304517 A1 | 12/2009 | Strother | |
| 2010/0221117 A1 | 9/2010 | Brennand et al. | |
| 2010/0236711 A1 * | 9/2010 | Strother et al. | 156/300 |
| 2010/0239427 A1 | 9/2010 | Strother | |
| 2011/0182744 A1 | 7/2011 | Strother et al. | |
| 2011/0274551 A1 | 11/2011 | Iwasaki | |

FOREIGN PATENT DOCUMENTS

| | | |
|---|---|---|
| EP | 1092485 A2 | 4/2001 |
| EP | 2014384 A1 | 1/2009 |
| EP | 2014386 A1 | 1/2009 |
| EP | 2014387 A1 | 1/2009 |
| EP | 2014388 A1 | 1/2009 |
| GB | 2154287 A | 9/1985 |
| GB | 2261032 A | 5/1993 |
| GB | 2371095 A | 7/2002 |
| GB | 2397855 A | 8/2004 |
| GB | 2401407 A | 11/2004 |
| GB | 2450934 A | 1/2009 |
| GB | 2450935 A | 1/2009 |
| GB | 2450937 A | 1/2009 |
| WO | 9727045 A2 | 7/1997 |

* cited by examiner

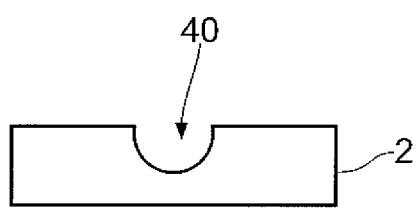
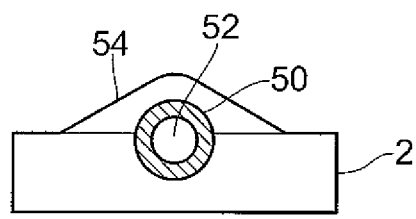
FIG. 3a  FIG. 3d
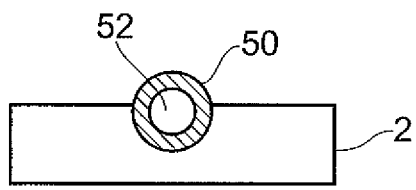
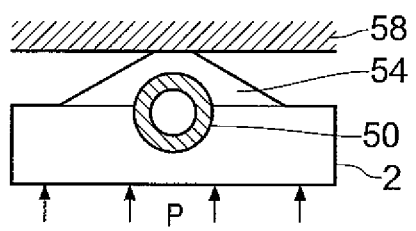
FIG. 3b  FIG. 3e
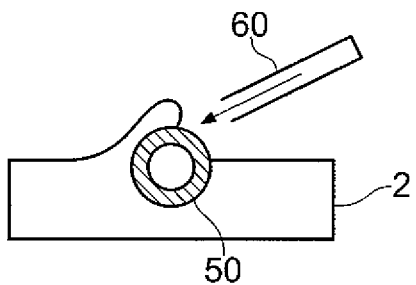
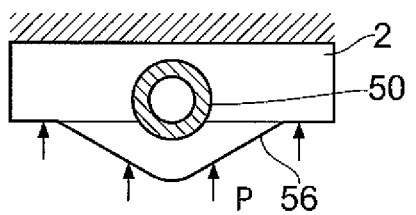
FIG. 3c  FIG. 3f

METHOD OF FORMING A HOLLOW COMPONENT WITH AN INTERNAL STRUCTURE

CROSS REFERENCE TO RELATED APPLICATION

This application is entitled to the benefit of British Patent Application No. GB 1001000.7, filed on Jan. 22, 2010.

FIELD OF THE INVENTION

The present invention relates to a method of forming a hollow component with an internal structure and particularly but not exclusively relates to forming hollow aerofoil components for gas turbine engines.

BACKGROUND OF THE INVENTION

It is known to manufacture hollow metallic aerofoils, for example to be used as blades in a jet engine, by superplastic forming and diffusion bonding metallic panels, the panels forming pressure and suction surfaces of the blade. Such blades are widely used in the civil aerospace industry and may also be used in blisks, particularly in military applications. The metallic panels may include elementary metal, metal alloys and metal matrix composites. At least one of the metallic panels must be capable of superplastic extension. In one known process the surfaces of the panels to be joined are cleaned, and at least one surface of the one or more of the panels is coated in preselected areas with a stop-off material to prevent diffusion bonding. The panels are arranged in a stack and the edges of the panels are welded together, except where a pipe is welded to the panels, to form an assembly. The pipe enables a vacuum, or inert gas pressure, to be applied to the interior of the assembly. The assembly is placed in an autoclave and heated so as to "bake out" the binder from the material to prevent diffusion bonding. The assembly is then evacuated, using the pipe, and the pipe is sealed. The sealed assembly is placed in a pressure vessel and is heated and pressed to diffusion bond the panels together to form an integral structure. Diffusion bonding occurs when two mat surfaces are pressed together under temperature, time and pressure conditions that allow atom interchange across the interface. The first pipe is removed and a second pipe is fitted to the diffusion bonded assembly at the position where the first pipe was located. The integral structure is located between appropriately shaped dies and is placed within an autoclave. The integral structure and dies are heated and pressurised fluid is supplied through the second pipe into the interior of the integral structure to cause at least one of the panels to be superplastically formed to produce an article matching the shape of the dies.

In addition to the hollow assembly just described, it is also known to insert a membrane between the metallic panels prior to the above described process. The location of diffusion bonds between the membrane and the adjacent panels can be controlled by applying the stop-off material to preselected areas on each side of the membrane (or respective panels). When the aerofoil is subsequently expanded, the membrane adheres to the panels where the diffusion bond is allowed to form and thereby provides an internal structure. The internal structure is provided to increase the strength and stiffness of the aerofoil and also to prevent lateral flexing of the panels, referred to as "panting".

The assembly may be filled or part filled by a suitable material to provide damping of the structure and therefore to reduce vibration. A suitable material may be one which possesses viscoelastic properties. Viscoelasticity is a property of a solid or liquid which when deformed exhibits both viscous and elastic behaviour through the simultaneous dissipation and storage of mechanical energy. A known method is to introduce a viscoelastic material, for example a Huntsman™ syntactic damping paste or some such similar product, into the cavity by injecting or otherwise introducing the material into some or all of the cavity. This technique may be applied in a hollow assembly wherein the cavity is smooth walled with no internal structure, as disclosed for example in GB2371095. In this configuration the viscoelastic material is restrained solely by the bond between the viscoelastic material and the walls of the cavity. If this bond is not sufficient to retain the viscoelastic material during working conditions, in particular centrifugal loading, then, since the viscoelastic material is a parasitic mass which is unable to support its own weight, the hydrostatic load of the unrestrained material can cause the blade to fail rapidly. Accordingly, the consequences of failure of this bond are severe. It is therefore desirable to provide some form of mechanical keying as an alternative or additional means of retaining and restraining the viscoelastic material. An internal structure, for example as described above, may be used to provide such a restraining or retaining effect on the injected material. However by providing a rigid internal structure the benefits of damping the aerofoil may be reduced as the aerofoil is less flexible as a result of the internal structure. This may lead to additional problems where the aerofoil prematurely fatigues or cracks as a result of the reduced flexibility. Other configurations use internal ribs, which may be attached to alternate interior walls of the aerofoil but which are not connected to one another, as disclosed for example in GB2450934. This configuration permits damping of the assembly whilst the re-entrant features still provide a means of retaining the injected material. Other methods use dual membranes to produce a lightweight internal structure in the aerofoil. Internal membranes or ribs may be mounted on protrusions created on the panels of the assembly during forging and transferred to the internal cavity during superplastic forming as described for example in GB2450934.

Known internal structures are such that they may advantageously bear a significant load under normal working conditions, thus allowing the thickness of the panels to be reduced and the size of the cavity to be increased. Also the internal structure may provide additional resistance to a bird strike or impact from ice or other foreign objects. However the use of an internal structure to physically restrain the viscoelastic material adds weight to the aerofoil and thus increases the stresses on the aerofoil, in particular at the root of the aerofoil. This increases the blade off energy if the blade were to fail, which must be taken into account when designing the blade retention system. In addition the provision of complex internal structures increases manufacturing costs and lead times. It is therefore desirable to provide an improved method of restraining a viscoelastic material within a cavity which addresses some or all of the above problems associated with the prior art methods.

SUMMARY OF THE INVENTION

According to the present invention, there is provided a method of forming a hollow component with an internal structure from first and second panels, the method including the steps of: providing a preform having first and second panels, the panels being oriented such that each panel defines an interior and an exterior facing surface with at least one protrusion extending from the exterior facing surface of at least one of the first and second panels; and expanding the preform against a die, such that the at least one protrusion is transferred from the exterior surface of the at least one panel to the interior surface of the at least one panel so as to define an internal structure The protrusion is formed by arranging an article on the exterior facing surface of the at least one panel; and encapsulating the article on the exterior facing surface of the at least one panel by a material deposition process.

Forming a protrusion using a material deposition process enables an internal structure to be created within the component without requiring protrusions to be formed on the panels during forging. This reduces the required thickness and hence the cost of the input panels. Without the need for forged protrusions, the panels require minimal forming or machine finishing and lend themselves to a flat pack design. Such simplifications in the necessary manufacturing procedure reduce cost and complexity of the overall process. Material deposition is also versatile, enabling the geometric position of the protrusion to be varied and selected according to a particular application.

The deposition process may include laser powder deposition, shaped metal deposition or other similar processes.

In such a manner, the elongate member forms a defining part of the protrusion. On expansion of the component the elongate member, together with the remainder of the protrusion formed by material deposition, is forced inward by pressure against the die and transferred to the internal surface of the panel. The elongate member is thus encapsulated just under the interior facing surface of the panel, defining an inward protrusion that forms an internal structure on the hollow component.

The elongate member may be arranged in a corresponding depression formed on the surface of the panel. Such a depression may be machined to facilitate positioning of the elongate member and subsequent retention of the elongate member in the desired position while the elongate member is encapsulated on an exterior surface by material deposition.

The elongate member may comprise a coating of deposition material, operable to aid adhesion of the deposited material to the elongate member during the material deposition process The elongate member may be hollow. A hollow elongate member reduces the overall weight of the hollow component, which may be desirable, particularly in aeronautical applications. A hollow elongate member may also provide a suitable housing for a sensor or probe to monitor conditions at the component.

The method may further include the step of reinforcing a cavity of the hollow elongate member before expanding the preform against the die. Reinforcement may be desirable to ensure the integrity of the cavity of the elongate member during expansion of the component.

The elongate member may be formed form a composite material which may be an organic, a ceramic or a metal matrix composite. The elongate member may be formed from a high tensile composite which may assist in load bearing of the component and improve impact performance.

Expanding the preform against the die may include the step of subjecting the preform to elevated heat and/or pressure conditions for example in a superplastic forming process.

The method may further comprise forming a plurality of protrusions on a respective surface of each of the first and second panels.

The plurality of protrusions may be positioned so as to interlock when transferred to the interior surfaces of the first and second panels during expansion of the preform. Such interlocking protrusions provide strength and material capture benefits without rigidly locking the two panels of the component together.

The method may further include the step of introducing a damping material into the expanded interior of the component.

The internal structure may be operable to retain the damping material in place in the expanded interior of the component.

The method may be employed to form an aerofoil or blisk for use in a gas turbine engine.

Although it is desirable to form the protrusion on the panels before they are assembled into the preform it is also possible to locate and encapsulate the article once the preform has been assembled.

According to another aspect of the present invention, there is provided a method of forming a protrusion on a product include the step of arranging a member on a surface of the product, and encapsulating the member on the surface of the product by a material deposition process. The member may be elongate or may have any other configuration appropriate to the application for which a protrusion is desired.

According to another aspect of the present invention, there is provided a hollow component having first and second panels that define an internal cavity, and at least one elongate member encapsulated beneath an internal surface of a panel and defining an internal structure that extends into the cavity.

Such a component may be in the form of an aerofoil or blisk employed in a gas turbine engine.

BRIEF DESCRIPTION OF THE DRAWINGS

For a better understanding of the present invention, and to show more clearly how it may be carried into effect, reference will now be made, by way of example, to the accompanying drawings, in which:

FIG. 1b illustrates a partially formed protrusion on the panel of FIG. 1a.
FIGS. 2b to 2e illustrate internal structure configurations for the aerofoil of FIG. 2a.
FIGS. 3a to 3f illustrate details of process steps for forming a hollow component with an internal structure.

DETAILED DESCRIPTION OF THE PREFERRED EMBODIMENTS

The present invention employs a feature transfer process to create an internal structure within a hollow component. However, in contrast to known processes, the external protrusions to be transferred to form the internal structure are created using a material deposition process.

Figure 1A:
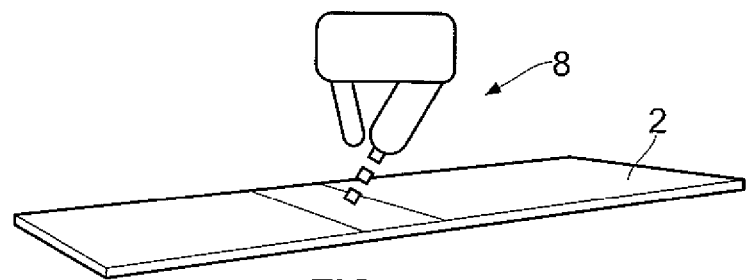
FIG. 1a illustrates a panel for use in forming a component.
Figure 1B:
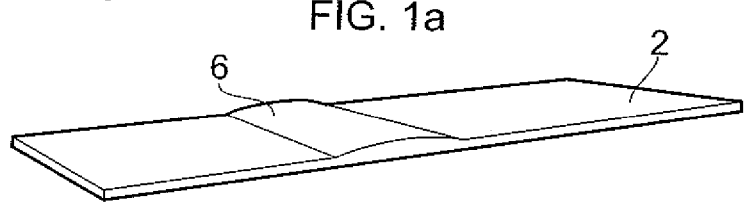
Figure 1C:
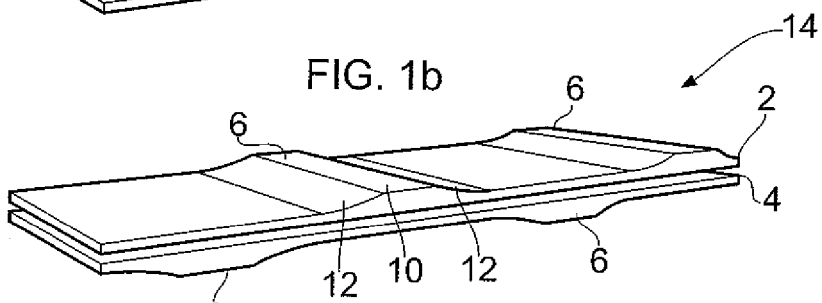
FIG. 1c illustrates a preform.

FIGS. 1a to 1c illustrate the initial steps in a method of forming a hollow component with an internal structure according to the present invention. The hollow component that is to be formed may be an aerofoil assembly, such as is used in a fan blade or other components of a gas turbine engine, or it may be any other appropriate hollow component as described in further detail below. The component is formed from a first panel 2 and a second panel 4. The material of the first and second panels may include elementary metals, metal alloys and metal matrix composites. In particular, one or more of the panels may be made from titanium, although other materials may be used. As shown in FIG. 1a the panels 2, 4 have planar surfaces and are forged to be between 2 and 7 mm thick. A material deposition process, represented at numeral 8, is then employed to form at least one protrusion 6 on a surface of at least one of the panels 2, 4. The material deposition process 8 may be laser powder deposition, shaped metal deposition or any such process that adds material to a surface of the panel.

Preferably, a series of protrusions is formed on a single surface of each of the first and second panels 2, 4. As illustrated particularly in FIGS. 1a and 1b, the material deposition process 8 builds up the protrusion 6 in stages, until the final form of the protrusion, illustrated in FIG. 1c, is achieved. In their final form, the protrusions 6 comprise a substantially planar web 10 and concave flanges 12 on either side of the web 10. The concave shape of the flanges 12 acts to prevent stress concentrations at the edges of the protrusions 6. The shape of the protrusions 6 formed by the web 10 and flanges 12 may differ from that shown and may vary along the length of the protrusion or from one protrusion to another. The shape of the protrusions 6 is chosen to provide the resulting component with desirable properties as described in further detail below.

Once the required number of protrusions has been formed on surfaces of the panels 2, 4, the panels are assembled into a preform 14, as illustrated in FIG. 1c. The panels are arranged such that the protrusions 6 extend from external surfaces of the preform 14, with the internal surfaces of the preform 14 being free of protrusions 6. The protrusions 6 of the first and second panels 2, 4 are positioned such that, when the panels are assembled, the protrusions are located at different positions along the length of the panels. The protrusions 6 thus form an alternating pattern such that each protrusion 6 of the second panel 4 falls in between adjacent protrusions 6 of the first panel 2, and vice versa. This arrangement is illustrated in FIG. 1c and results in an interlocking configuration following expansion as discussed below. Although the protrusions 6 of the second panel 4 are shown as falling substantially in the centre of the two adjacent protrusions 6 of the first panel 2, it is envisaged that other patterns may be used in which the distances between protrusions are not equal and may vary along the length of the assembled panels. The above variations may be advantageous for enabling certain sections of the resulting component to have desired properties, as described in more detail below.

The first and second panels 2, 4 of the preform 14 are selectively bonded together along their respective edges. The panels 2, 4 may be bonded by any known method for example brazing or welding, however as described previously it is advantageous to bond the assembly using diffusion bonding. As previously described the diffusion bonding process requires the assembly to be exposed to heat, pressure and time conditions which allow atom interchange. In order to selectively bond only certain areas of the assembly, for example the areas around the surrounding edges, it is first necessary to apply a stop-off material at the locations where bonding is not required. The stop-off material is selected depending on the material of the panels and for panels manufactured from titanium the stop-off material may be Yttria. The stop-off material may be applied to the internal surfaces of the first and second panels 2, 4 by means of screen-printing or other known methods of applying the stop-off material. The material is applied to all surfaces except where bonds are desired. As previously described, the panels are then arranged in a stack and the edges of the panels welded together. A vacuum, or inert gas pressure, is applied to the interior of the preform 14. The preform 14 is then placed in an autoclave and heated so as to "bake out" the binder from the material to prevent diffusion bonding. The preform is then evacuated and sealed. The sealed preform is placed in a pressure vessel and is heated and pressed to create diffusion bonds between the panels.

The bonded preform is then inflated or expanded so as to create the required hollow cavity in the component and transfer the protrusions 6 into the interior of the cavity, forming the desired interior structure. An example of an appropriate method of inflating the assembly is described below for completeness, although other known techniques may be used. Initially, the preform is located between appropriately shaped dies, the assembly and dies are heated and pressurised fluid, for example Argon gas, is supplied into the interior of the preform to cause at least one of the panels to be formed to produce an article matching the shape of the dies. The forming of the panels may be superplastic. The dies comprise substantially planar surfaces which contact the webs 10 of the protrusions 6 on the first and second panels prior to the supply of the pressurised fluid. Following the pressurisation of the preform, the sections of the first and second panels which were not in contact with the dies are forced against the dies so as to form substantially planar exterior surfaces to the component. As a result, the exterior protrusions 6 of the first and second panels 2, 4 are replaced by interior protrusions (not shown), which are of similar size and shape to the exterior protrusions 6. The exterior protrusions 6 are effectively transferred to the interior surfaces of the panels. As a result a hollow cavity is formed within the component. Alternatively, the webs 10 of the first and second panels may not contact the dies prior to the pressurisation of the assembly and accordingly the assembly may expand during pressurisation until the webs 10 contact the dies. The exterior protrusions 6 need not be fully transferred to form the interior protrusions and the degree to which the exterior protrusions 6 are transferred depends particularly on the pressure of the pressurised fluid and the thickness of the first and second panels. In certain applications it may be advantageous to only partially transfer the exterior protrusions 6, thus creating a component with both interior and exterior protrusions. This may be particularly beneficial in applications where it is desirable to modify the turbulence and/or increase the surface area of the component, such as in a heat exchanger matrix.

The hollow cavity formed following inflation of the component is then filled or partially filled with a damping material, such as a viscoelastic material, as previously described. This may be injected or introduced into the cavity via any suitable means. For example a fill hole may be drilled in the surface of one of the panels to enable to material to be injected into the cavity. The viscoelastic material may be a two-part system, typically epoxy based, which is mixed shortly before being injected into the cavity and chemically sets once it is in place.

Figure 2A:
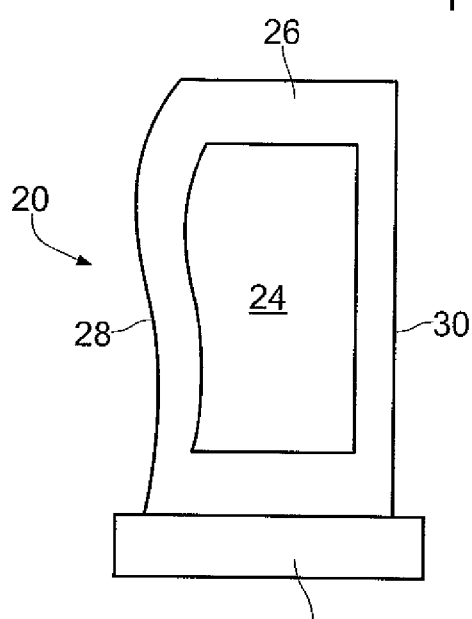
FIG. 2a illustrates an aerofoil.
Figure 2B:
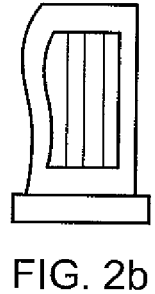
Figure 2C:
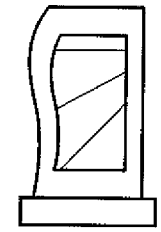
Figure 2D:
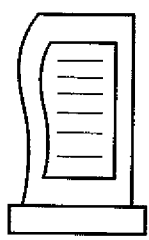
Figure 2E:
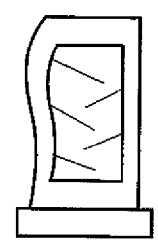

As noted above, various configurations of protrusions 6 may be created, in order to form the desired internal structure on completion of the component. FIGS. 2b to 2e illustrate alternative arrangements of internal structures which may be formed via protrusions 6 transferred to the interior of the component during forming as described above. Each of the arrangements is illustrated with respect to a hollow aerofoil blade 20, as shown in FIG. 2a. The hollow aerofoil blade 20 is formed with a root 22, internal cavity 24, tip 26, leading edge 28 and trailing edge 30. As illustrated, the transferred protrusions of the internal structure may extend along or across the cavity 24 of the blade and they may be interlaced. In addition, the protrusions may extend in the spanwise or chordwise directions of the aerofoil 20, may be curved or may be angled in any other direction. The orientation of the protrusions may vary within the aerofoil 20. For example, near the tip 26 of the aerofoil 20 they may extend substantially parallel to the tip 26. This may be desirable since the steady stresses at the tip 26 are lower and the parallel configuration maximises strength of the tip 26 against impact by a foreign body. Towards the root 22 of the aerofoil 20 the protrusions may extend substantially parallel to the length of the aerofoil 20 so as to enhance the steady strength of the aerofoil 20. Furthermore, the method described above may be employed only in a section or sections of the aerofoil 20. Variations in damping properties can be achieved by altering the location and orientation of protrusions provided on the first and second panels 2, 4. Such variations can also be achieved by altering the dimensions of the protrusions and extent to which the protrusions are transferred from the exterior to the interior of the preform. The resulting interior protrusions may vary from one to another and advantageously may be formed so that the interior protrusions of the first panel 2 are of one height and the interior protrusions of the second panel 4 are of another height. This configuration produces different damping properties for each surface of the aerofoil and therefore may be particularly beneficial for use in fan blades wherein the suction surface of the blade is exposed to possible strikes from debris and birds. Modification of these features may also ensure that the damping material is suitably retained within the cavity.

A complicated internal structure can thus be formed from a flat pack construction. The internal structure can be manufactured inside a small cavity of low thickness, rendering the described method particularly suitable for manufacturing thin aerofoils which require an internal cavity for damping purposes. In addition, a complex internal structure can be created while maintaining the forged material properties of the panels 2, 4. Such properties may be required for highly stressed rotating structures such as aerofoil blades in a gas turbine engine.

It is a particular advantage of the present invention that the protrusions 6, which are transferred to the interior of the component to form the internal structure, are formed by a material deposition process on otherwise smooth forged panels. According to known methods, protrusions are formed during the forging process, or are machined into the panels in post forging process operations. These methods of forming protrusions require increased thickness in the forged panels. Post forging material deposition allows the forged panel thickness to be reduced and hence reduces the overall cost of the procedure. In addition, material deposition enables a flat pack design, requiring minimal forming and finish machining operation. A further advantage of material deposition is the flexibility of protrusion location, orientation and geometry that can be achieved. Increased complexity in the protrusion lay out and design can be accommodated compared to conventional methods, allowing the internal structure layout and geometry to be tailored to specific application requirements. Overall, the process is simpler, cheaper and easier to control when compared with conventional methods.

A particularly advantageous embodiment of the present invention is now described with reference to FIGS. 3a to 3f. According to this embodiment, a depression or channel 40 is formed in a surface of the panels 2, 4 at each location where a protrusion 6 is to be formed. An elongate member 50 is then placed within each channel 40. The elongate member 50 may be a metallic structure or may be a ceramic or organic composite structure. The elongate member 50 may be in the form of a pipe, strut, strip or fibre and may be coated in a shroud of metallic or deposition material to aid bonding during the material deposition process as described below. The elongate member 50 may be hollow, as illustrated in the figures, with a central cavity running along its length. Once in position, the elongate member 50 is then encapsulated into the surface of the panel 2, 4 by a material deposition process indicated at numeral 60. The material deposition process 60 encases the elongate member creating a protrusion 54 around and above the elongate member 50, as illustrated particularly in FIG. 3d. The central cavity 52 of the hollow elongate member may then be reinforced, for example by the application of pressure, to support the cavity during superplastic forming of the component. As previously described, once the desired number of protrusions has been formed in appropriate locations, the panels 2, 4 are assembled into a preform (not shown), diffusion bonded and placed between appropriately shaped dies 58 for expansion. As illustrated in FIG. 3e, the tips of the protrusions 54 make initial contact with the surface of the dies 58. Forming pressure P then forces those sections of the first and second panels which were not already in contact with the dies against the die surfaces so as to form substantially planar exterior surfaces. During this process, the elongate member 50 is effectively transferred from its starting location in the protrusion 54, encapsulated on an outer surface of the panel 2, to a new location within a newly formed interior protrusion 56, contained immediately beneath an internal surface of the panel 2, as illustrated in FIG. 3f. Thus an internal structure is formed within a hollow component, the configuration of which is defined by the location of hollow elongate members integrated within the internal surfaces of the component.

It will be appreciated that the various configurations of protrusion 6 discussed above with respect to FIG. 2 may also be employed with respect to the present embodiment of the invention. Preferably, an interlocking configuration is created, with internal protrusions interleaving with corresponding protrusions on the opposite internal surface. In this manner, the protrusions of the internal structure can interact with the subsequently injected damping material to prevent creep deformation and bulk failure of the damping material and to assist in damping of the blade without imparting undesirable rigidity to the blade.

It will also be appreciated that the material of the elongate members 50 encapsulated within the internal skin of the component may impart desirable mechanical properties to the component such as impact resistance. Incorporating for example high tensile composites into the component skin can assist in carrying the radial weight of the component as well as improving impact properties. In addition, hollow elongate members reduce the overall weight of the component which may be highly desirable, for example in aeronautical applications. A hollow elongate member 50 also provides a suitable location for the insertion of a probe such as a thermocouple or motion sensor. Conditions at the component can thus be monitored without affecting the external profile of the component. This may be particularly desirable in a blade for a gas turbine engine, allowing engine telemetry to be improved without adversely affecting blade performance.

It is possible that for some applications, other forms of protrusions may be desired for the internal structure. In such circumstances, the geometry of the elongate member 50 may be altered, for example the member 50 may not be elongate but may take other forms as required by the specific application.

The present invention has been described in this specification with particular reference to the forming of an aerofoil component, in particular for use as a fan blade in a gas turbine engine. However, it should be appreciated that the invention may be used in any component where the retention of a damping material or other material is required. This may include both rotating and static components. For example, the invention may be used to form internal enclosed or vented cavities within hollow fan blades or blisks for civil or military uses. The invention may also be used to form vibration damped static components. Alternative uses of the inventions may be found in structures where materials need to be restrained due to high gravitational or centripetal loading or where high surface areas are required inside a component.

To avoid unnecessary repetition of text in this specification, certain features are described in relation to only one or several aspects or embodiments of the invention. However, it is to be understood that, where it is technically possible, features described in relation to any aspect or embodiment of the invention may also be used with any other aspect or embodiment of the invention.

The invention claimed is:

1. A method of forming a hollow component with an internal structure from first and second panels, the method comprising:
   providing a preform comprising first and second panels, the panels being oriented such that each panel defines an interior and an exterior facing surface with at least one protrusion extending from the exterior facing surface of at least one of the first and second panels; and
   expanding the preform against a die, such that the at least one protrusion is transferred from the exterior facing surface of the at least one panel to the interior facing surface of the at least one panel so as to define an internal structure,
   wherein the protrusion is formed by arranging an article on the exterior facing surface of the at least one panel; and encapsulating the article on the exterior facing surface of the at least one panel by a material deposition process.

2. A method as claimed in claim 1, wherein the article is an elongate member.

3. A method as claimed in claim 2, wherein the elongate member is arranged in a corresponding depression formed on the exterior facing surface of the panel.

4. A method as claimed in claim 2, wherein the elongate member comprises a coating of deposition material, operable to aid adhesion of the deposited material to the elongate member during the material deposition process.

5. A method as claimed in claim 2, wherein the elongate member is hollow.

6. A method as claimed in claim 5, further comprising reinforcing a cavity of the hollow elongate member before expanding the preform against the die.

7. A method as claimed in claim 2, wherein the elongate member is formed from a composite material.

8. A method as claimed in claim 1, further comprising forming a plurality of the at least one protrusions on a respective exterior facing surface of each of the first and second panels.

9. A method as claimed in claim 8, wherein the plurality of protrusions are positioned so as to interlock when transferred to the interior facing surfaces of the first and second panels during expansion of the preform.

10. A method as claimed in claim 1, further comprising introducing a damping material into the expanded preform of the component.

11. A method as claimed in claim 10, wherein the internal structure is operable to retain the damping material in place in the expanded preform of the component.

12. A method as claimed in claim 1, further comprising the step of forming the protrusion on the exterior facing surface of the first panel and assembling the first and second panels into the preform.

* * * * *